United States Patent [19]

Woestman

[11] Patent Number: 4,623,879
[45] Date of Patent: Nov. 18, 1986

[54] SYSTEM FOR VERIFYING THE POSITION OF A MOVABLE TABLE

[75] Inventor: John W. Woestman, Lancaster, Pa.

[73] Assignee: RCA Corporation, Princeton, N.J.

[21] Appl. No.: 766,281

[22] Filed: Aug. 16, 1985

[51] Int. Cl.[4] ............................................. G08B 21/00
[52] U.S. Cl. .................................... 340/686; 340/540; 354/1
[58] Field of Search .................... 340/686, 540; 354/1

[56] References Cited

U.S. PATENT DOCUMENTS 3,588,867 6/1971 Harris .................................. 340/686
4,370,036 1/1983 Kelly et al. ............................ 354/1

Primary Examiner—Glen R. Swann, III
Attorney, Agent, or Firm—E. M. Whitacre; D. H. Irlbeck; L. L. Hallacher

[57] ABSTRACT

A system for verifying the position of a moveable table within a narrow range includes a sensor which yields an output proportional to the travel of the moveable table. A comparator receives the output and provides an output pulse when the travel is within a selected range. A pulse generator receives the output pulse and provides a control pulse. Logic means receives the control pulse and provides either an alarm signal or a ready signal.

10 Claims, 3 Drawing Figures

SYSTEM FOR VERIFYING THE POSITION OF A MOVABLE TABLE

BACKGROUND

This invention relates generally to positioning equipment and particularly to a system for verifying the positioning of a movable table within a narrow distance range.

The picture tube for many color television receivers includes a phosphor screen which is composed of alternating stripes of phosphor, each of which emits a different color of light when impacted by electrons. The phosphor stripes are produced on a faceplate panel by coating the inside surface of the panel with a slurry containing a photosensitive material and one of the phosphors. An apertured shadow mask is inserted into the panel and the panel is placed upon a movable table of an exposure mechanism, commonly called a lighthouse. The lighthouse includes a bright light source which is used to expose the slurry to light. The shadow mask contains a large number of apertures and accordingly during the exposure the faceplate panel is moved so that the slurry portions shaded by the metal between the apertures are exposed and continuous lines are produced on the screen. After the exposure is completed the panel is removed from the movable lighthouse table. The shadow mask is removed and a slurry containing the photosensitive material and another phosphor is coated onto the panel. The shadow mask is reinserted and the panel is again placed onto the movable lighthouse table. The lighthouse table is returned to the original starting position prior to the panel being put back onto the lighthouse. U.S. Pat. No. 4,370,036 describes a system for controlling a lighthouse which operates in this manner.

The locations of the phosphor stripes on the screen relative to each other, and with respect to the shadow mask, are very important. Also, the lensing for the exposing light is different for each of the three color producing phosphor to simulate the paths of the electron beams toward the phosphor screen. For these reasons, it is important that the lighthouse table very accurately return to the original starting position prior to receiving a panel. When the movable lighthouse table is not accurately returned to the original starting position, within a narrow tolerance range, an unusable screen usually is produced. Accordingly, there is a need for a system for verifying the positioning of a movable table within a very precise distance range. The present invention fulfills this need.

SUMMARY

A system for verifying the positioning, within a distance range, of a movable table at a desired location includes a sensor arranged in the proximity of the table. The sensor provides a distance signal the level of which is proportional to the distance between the sensor and the table. A comparator has an input terminal which receives the distance signal through a fixed impedance. Another input terminal of the comparator receives the distance signal through unidirectional conduction means, the impedance of which varies in accordance with the input signal. Accordingly, the comparator provides a steep output pulse having a width related to the distance range. A control pulse generator responds to the output pulse whereby the control pulse generator provides a control pulse during the reception of the output pulse. Logic means responds to the control pulse and to a table-at-home signal to provide a ready signal when the object is within the distance range, and to provide an alarm signal when the object is outside the distance range.

DETAILED DESCRIPTION

Figure 1:
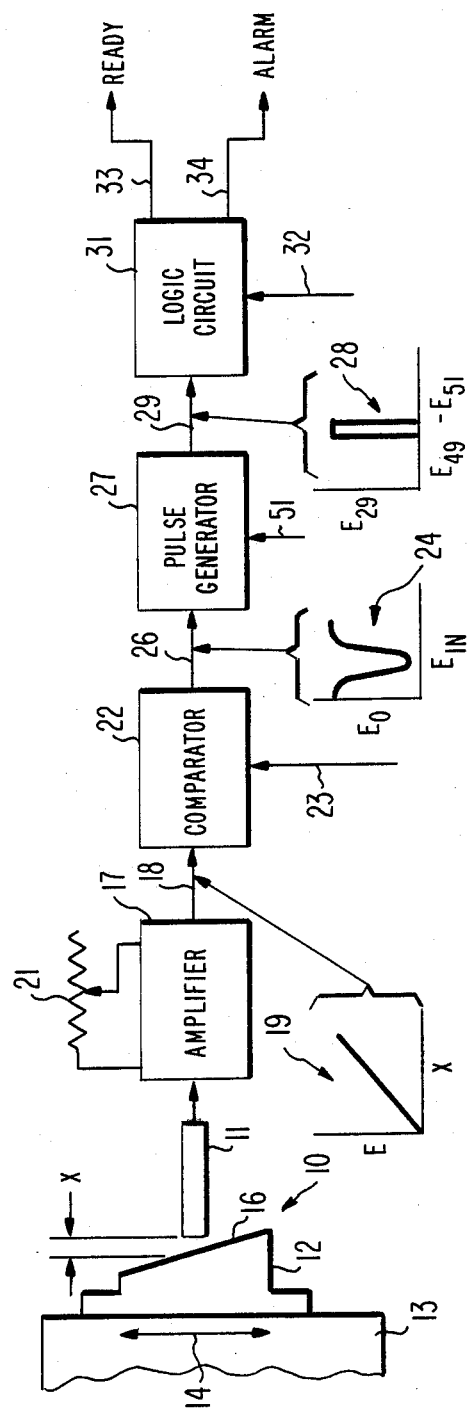
FIG. 1 is a block diagram of a preferred embodiment.

In FIG. 1, the inventive position verifying system includes a sensor 10. The sensor 10 can be eddy current sensor, and as such, includes a coil 11 and a conductive element 12. The conductive element 12 is affixed to a movable table 13. The table 13 is shown broken away and is used to support a picture tube faceplate panel to be exposed on a lighthouse. Accordingly, the table moves linearly in the direction indicated by the arrow 14. The conductive element 12 is physically attached to the table 13 and therefore, moves linearly along with the table 13. The conductive element 12 includes a surface 16, which is angularly disposed with respect to the direction of motion of the table 13. The coil 11 is physically fixed in the proximity of the conductive element 12 and, accordingly, because of the angular disposition of the surface 16, the distance X between the coil 11 and the surface 16 increases at a rate determined by the angle selected for the surface 16. The angle for the surface 16 is selected so that a large linear movement of the table 13 results in a small change in the distance X between the coil 11 and the surface 16. For this reason a substantial table excursion is possible without exceeding the sensitvity of the sensor 10. In the preferred embodiment a 5:1 ratio is used. Thus, a 5 mil excursion of the table 13 results in a 1 mil change in the distance X. The output of the coil 11 is linear and increases as the distance between the coil 11 and the surface 16 increases. The output of the coil 11 is applied to a linear amplifier 17. Accordingly, the output voltage on a line 18 coupled to the output terminal of the amplifier 17 is a voltage which increases linearly as the distance X between the coil 11 and the surface 16 increases. Thus, the output voltage on the line 18 is similar to the waveform 19 of FIG. 1, in which $E_{IN}$ represents the voltage out of the amplifier 17 as a function of the distance X between the coil 11 and the surface 16. The amplifier 17 has an internal potentiometer 21 which can be used to adjust the distance X at which an output pulse is produced in a manner described hereinafter. The amplifier 17 is a standard commercially available amplifier, for example, an Electro Corporation Model No. PBA-200 amplifier can be used. The sensor 10 also is commercially available, for example, a Model 4960 eddy current sensor available from Electro Corporation can be used. When the sensor 10 is an eddy current sensor the amplifier 17 is also used to energize the coil 11.

The linear voltage $E_{IN}$ available on the line 18 is provided as an input signal to a window comparator 22. The window comparator 22 compares the voltage on the line 18 to an electrical offset voltage provided on a line 23 to produce an output pulse, such as the pulse 24, on a line 26, in a manner fully described hereinafter. For the pulse 24, the voltage $E_O$ is the voltage on the line 26 as a function of the input voltage $E_{IN}$ on the line 18. The input voltage $E_o$ is a function of the distance X between the coil 11 and surface 16 and, therefore the pulse 24 is a function of the distance X. The pulse 24 on the line 26 is provided as an input signal to a pulse generator 27 to produce a control pulse 28 on a line 29, in a manner described hereinafter. The control pulse 28 is applied by the line 29 to a logic circuit 31. The logic circuit 31 also receives an input signal from a line 32. The signal is provided on this line when the table 13 has been returned to the original position. The logic circuit 31 produces a ready signal on an output line 33 when the distance X between the coil 11 and the surface 16 is within a preselected distance range. The logic circuit 31 produces an alarm signal on an output line 34 when the table is not within the preselected distance range.

Figure 2:
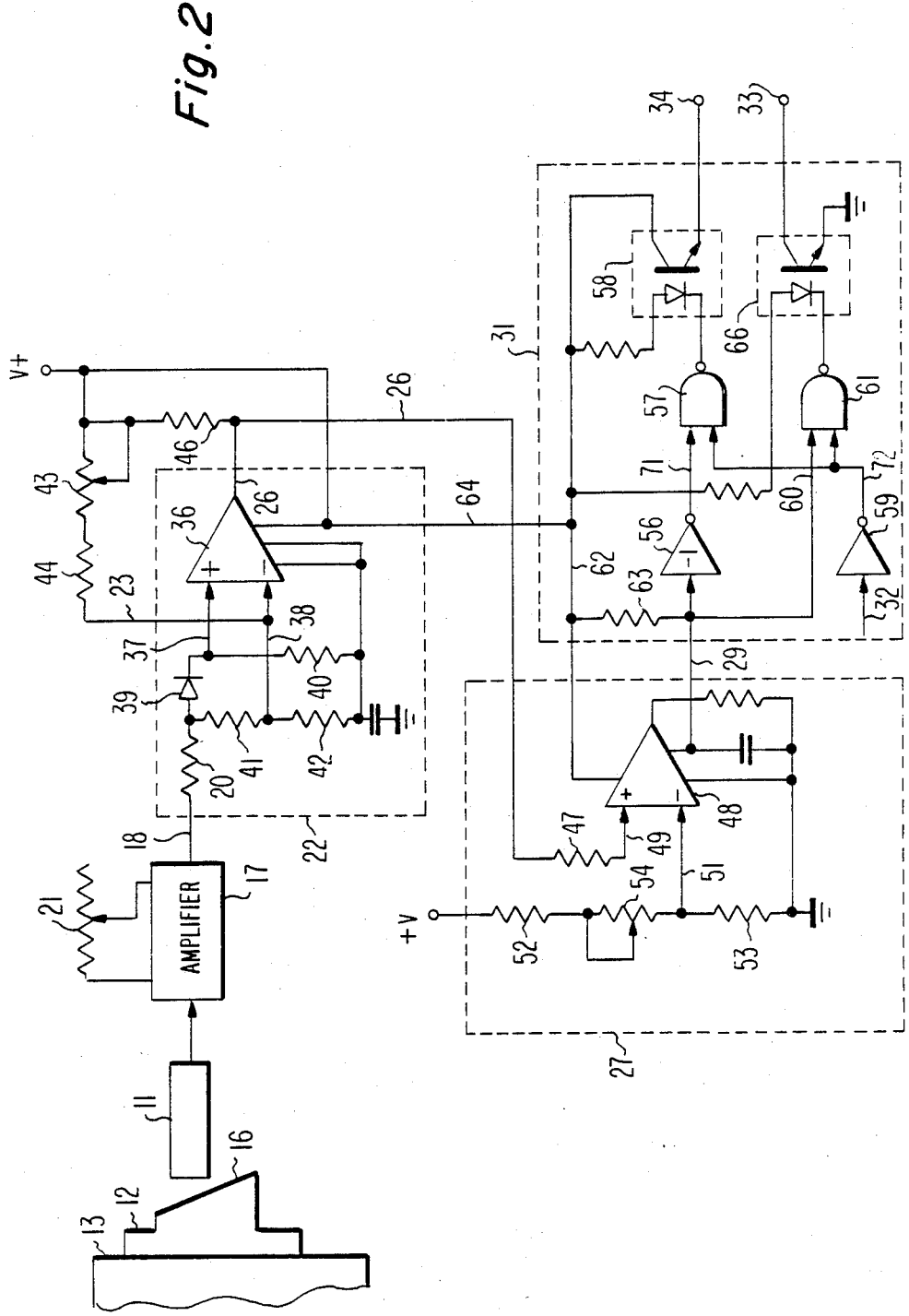
FIG. 2 is a more detailed showing of the preferred embodiment of FIG. 1.

In FIG. 2, the comparator 22 includes a solid state multi-input terminal comparator 36 having a positive input terminal 37 and a negative input terminal 38. The positive input terminal 37 of the comparator 36 receives the output voltage of the amplifier 17, which is available on the line 18, through a unidirectional conduction means 39, such as a diode. The negative input terminal 38 of the comparator 36 receives the voltage available on the line 18 through a resistive voltage divider including fixed resistors 41 and 42. The negative input terminal 38 of the comparator 36 is positively biased through a potentiometer 43, a fixed resistor 44 and the line 23. The line 26, which receives the output of the comparator 36, also is positively biased through a resistor 46. The line 26 is coupled to an input terminal 49 of the pulse generator 27 through a resistor 47. The resistance of resistor 47 is substantially higher than that of the resistor 46, for example a 100:1 ratio. Accordingly, the voltage on the line 26 is substantially equal to the voltage of the biasing source, such as +5 volts.

The control pulse generator 27 includes an operational amplifier 48. The input terminal 49 of the operational amplifier 48 is biased positive by the line 26 and the resistor 47. The other input terminal 51 of the operational amplifier 48 is biased positive through a voltage dividing network including resistors 52, 53 and a potentiometer 54. The logic circuit 31 includes an inverter 56, the input terminal of which is coupled to the line 29, which receives the output of the control pulse generator 27. The output of the inverter 56 is coupled to one input terminal 71 of a NAND Gate 57. The output terminal of the NAND Gate 57 is coupled to the LED of an opto-isolator 58. The photosensitive element of the opto-isolator 58 provides the alarm signal on the output line 34. The logic circuit 31 includes another inverter 59 which receives a ready pulse from the line 32. The ready pulse is received from the controller which controls the lighthouse being used to expose the panel, as described in U.S. Pat. No. 4,370,036. The output of the inverter 59 is coupled by a line 72 to one input terminal of a NAND Gate 61 and to the other input terminal of the NAND Gate 57. The other input terminal 60 of the NAND Gate 61 is biased positive by lines 62, 64 and 26, and a resistor 63. The output of NAND Gate 61 is coupled to the LED of an opto-isolator 66 the output of which provides the ready signal on the output line 33 when the moveable table 13 has returned to the home position within the preselected distance range.

When the table 13 is within the preselected distance range the low output pulse 24 (FIG. 1) is provided to the pulse generator 27 by the line 26. The line 29, which is coupled to the output of the operational amplifier 48, is high. Accordingly, the output of the inverter 56 is low and the input terminal 71 of NAND Gate 57 is low. When a table-at-home signal is provided to line 32 the line is low and the output of the inverter 59 on the line 72 is high. The output of the NAND Gate 57, therefore, is high. Both sides of the diode in the opto-isolator 58 are then high and the diode can not conduct. The output line 34 of the opto-isolator 58 is then low and no alarm signal is given. When the table 13 moves out of the selected distance range the line 26 goes low and the output line 29 of the operational amplifier 48 also goes low. The output of the inverter 56 on the line 71 goes high, both input terminals of NAND Gate 57 are then high and the output goes low. The diode in opto-isolator 58 is then conductive and the output line 34 goes high giving an alarm signal.

With the movable table 13 within the distance range the output line 29 of the operational amplifier 48 is high. Accordingly, when the low table-at-home signal is present on the line 32 both input of the lines 60 and 72 to the input terminals of NAND Gate 61 are high and the output is low. The diode in opto-isolator 66 is thus conductive and a ready signal is provided on the output line 33.

Figure 3:
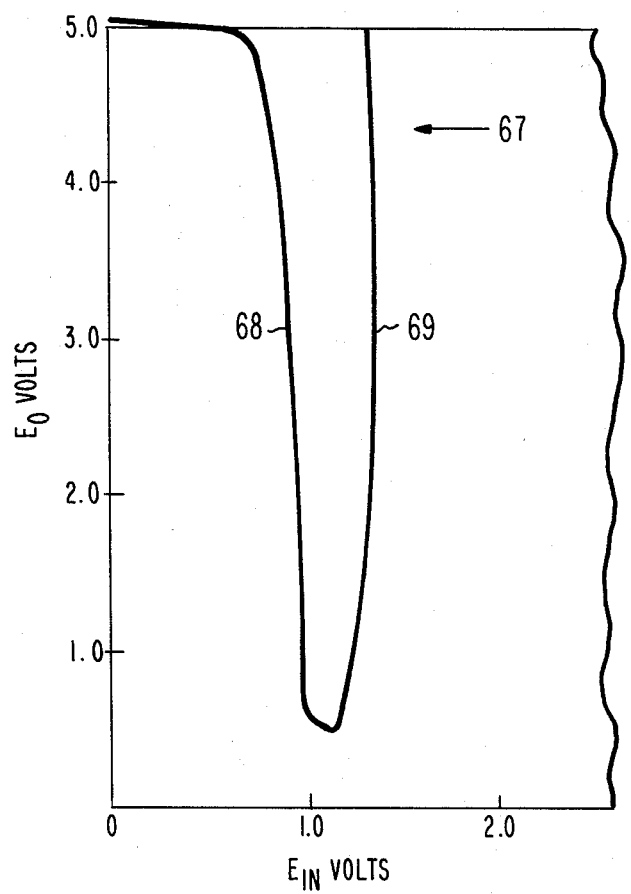
FIG. 3 shows the output pulse produced by the comparator.

In operation, the comparator 36 (FIG. 2) receives the input signal 19 from the proximity sensor 11 as a ramp from zero to some maximum voltage (e.g. +10 volts) as a function of the distance) between the coil 11 and the surface 16. When the signal voltage is close to zero the voltage drop across diode 39 is small and the diode current is low. The current into the positive input line 37 consists of the input offset current (a specified characteristic of operational amplifiers) plus a portion of the diode 39 current, as determined by the resistor 40 and the input impedance of the comparator 36. The current into the negative input terminal on the line 38 consists of a portion of the current through the resistor 44 as determined by the resistors 41 and 42 and the negative input impedance of the comparator 36. The circuit is set up such that with zero input signal the comparator output on the line 26 is biased high (+5 volts). This biasing voltage can be adjusted by adjustment of the trimmer potentiometer 43. Under these conditions the input current to the positive terminal 37 exceeds the input current to the negative terminal 38 and the comparator output voltage on the line 26 is high. As the input voltage on the line 18 rises, the currents into the positive input terminal 37 and negative input terminal 38 also rise. However, the negative input current rises at a greater rate than the positive input current because the effective resistance of the diode 39 is larger than the resistance of the resistor 41. At some value of the input voltage the negative input current exceeds the effective positive input current and the line 26 of the comparator 36 goes low, producing the initial transition 68 of the pulse 67 of FIG. 3, which is a more detailed illustration of the pulse 24 of FIG. 1. The input voltage ramp 19 on the line 18 continues to rise, and increase the voltage drop across the diode 39 so that the effective resistance of the diode 39 decreases in accordance with the non-linear diode characteristic. When the resistance of diode 39 is comparable to that of resistor 41 the positive input current begins to rise faster than the negative input current and the condition is soon reached where the positive input current again exceeds the negative input current. When this occurs the line 26 of the comparator again goes high and the subsequent transition 69 of the pulse 67 in FIG. 3 is produced. The bias on the diode 39 can be changed by adjustment of the potentiometer 43. Accordingly, the potentiometer 43 provides the offset voltage to the comparator 36 and can be used to change the width and voltage excursion of the pulse 67. The values of resistors 21, 41, 42, 40 and 44 are chosen to provide the maximum slope, and narrowest width of the output voltage versus input voltage characteristic shown in FIG. 3. The minimum value of output voltage is a compromise with width of the pulse.

The operational amplifier 48 receives the output of the comparator 36 and operates as a simple comparator. The threshold is adjusted by means of the potentiometer 54 such that the output on the line 29 is a logic high when the comparator 36 output is low and is a logic low when the comparator 36 output is high. It is possible to adjust the system so that the movable table 13 returns to the home position within a tolerance of plus/minus less than 1 mil within a preselected distance of approximately 40 mils. That is, the home position can be adjusted to occur within a 40 mil range with a tolerance of approximately 1 mil.

As explained hereinabove, in the logic circuit 31 the NAND gates 57, 61 and the opto-isolators 58, 66 provide a READY output signal when the movable table 13 is at the home position and the table-at-home input signal is received on the line 32. Whe the table 13 is not at the proper home position an ALARM signal is provided.

In FIG. 3, the control pulse 67 has an initial transition 68 and a subsequent transition 69. Typically the initial transition 68 commences at substantially the same voltage. Thus, the initial transition typically begins at approximately 0.8 volts and the subsequent transition occurs at approximately 1.4 volts. The distance X between the energy transmitter 11 and the surface 16 at which the 0.8 $E_{IN}$ voltage occurs can be adjusted by adjusting the potentiometer 21 of the amplifier 17 (FIG. 1). Adjustment of this potentiometer has the effect of changing the slope of the ramp 19 to change the distance X at which the ramp reaches the $E_{IN}$ voltage. The ability to adjust the distance X at which the control pulse 27 triggers is convenient when changing panel sizes, and when calibrating the lighthouse in which the system is used, because neither the coil 11 or the conductive member 12 need be physically moved.

What is claimed is:

1. A system for verifying the positioning, within a distance range, of a movable table at a desired location, comprising:

sensor means arranged in the proximity of said table, said sensor means providing a distance signal the level of which is proportional to the distance said table has moved;

multi-input terminal comparator means, one input terminal of said comparator means receiving said distance signal through a fixed impedance means, and another input terminal of said comparator means receiving said distance signal through undirectional conduction means having an impedance which varies in accordance with the input signal, whereby said comparator means provides a steep output pulse having a width related to said distance range;

control pulse generator means responsive to said output pulse, whereby said control pulse generator means provides a control pulse during the reception of said output pulse; and logic means responsive to said control pulse and to a table-at-home signal for providing a ready signal when said object is within said distance range and an alarm signal when said object is outside said distance range.

2. The system of claim 1 further including means for adjusting said distance range.

3. The system of claim 2 wherein said unidirectional conduction means is a diode whereby the input current to said another input terminal increases as said distance signal increases.

4. The system of claim 3 wherein said fixed impedance means is a resistive voltage divider.

5. The system of claim 1 wherein said multi-input terminal comparator is a solid state comparator having a positive input terminal and a negative input terminal, and wherein said fixed impedance means is coupled to said negative input terminal whereby input current to said negative terminal increases as said distance signal increases, and wherein said unidirectional conduction means includes a diode coupled to said positive input terminal, whereby input current to said positive terminal initially increases at a slower rate than the input current to said negative terminal until the impedance of said diode is substantially reduced and the current input rate to said positive terminal exceeds the current input rate to a negative terminal, whereby the initial transmission of said output pulse is triggered by a selected level on said negative input terminal, and the subsequent transition of said output pulse is triggered by a level on said positive input terminal.

6. The system of claim 5 further including means for biasing the output terminal of said comparator normally positive whereby said initial transition of said output pulse is negative going.

7. The system of claim 6 further including variable biasing means for biasing said output terminal whereby said output voltage on said output terminal is varied by said variable biasing means.

8. The system of claim 7 wherein said variable biasing means includes a potentiometer.

9. The system of claim 1 wherein said sensor means includes a fixed member arranged in the proximity of said movable table and a conductive member moveable with said moveable table, said moveable member having a surface angularily disposed with respect to the direction of travel of said movable table whereby the distance between said fixed member and said moveable member varies as said moveable table moves, and said fixed member provides an output signal proportional to said distance between said fixed member and said moveable member.

10. The system of claim 9 wherein said sensor is an eddy current sensor whereby said fixed member is a coil and said moveable member is a conductive member.

* * * * *